US012229266B2

(12) United States Patent
Yim et al.

(10) Patent No.: US 12,229,266 B2
(45) Date of Patent: Feb. 18, 2025

(54) SYSTEMS AND METHODS FOR PROTECTING INFORMATION HANDLING SYSTEMS USING A RANSOMWARE PROTECTION STORAGE DEVICE

(71) Applicant: Dell Products, L.P., Round Rock, TX (US)

(72) Inventors: Wai Chuen Yim, Merrimack, NH (US); Walter O'Brien, III, Westboro, MA (US); Ali Aiouaz, Bee Cave, TX (US)

(73) Assignee: Dell Products, L.P., Round Rock, TX (US)

( * ) Notice: Subject to any disclaimer, the term of this patent is extended or adjusted under 35 U.S.C. 154(b) by 171 days.

(21) Appl. No.: 18/050,892

(22) Filed: Oct. 28, 2022

(65) Prior Publication Data
US 2024/0143764 A1 May 2, 2024

(51) Int. Cl.
*G06F 21/50* (2013.01)
*G06F 21/56* (2013.01)

(52) U.S. Cl.
CPC .......... *G06F 21/568* (2013.01); *G06F 21/567* (2013.01); *G06F 2221/033* (2013.01)

(58) Field of Classification Search
CPC ................. G06F 21/568; G06F 21/567; G06F 2221/033; G06F 21/575
See application file for complete search history.

(56) References Cited

U.S. PATENT DOCUMENTS

2018/0107824 A1\* 4/2018 Gibbons, Jr. .......... G06F 21/565
2021/0409425 A1\* 12/2021 Varshney .............. G06F 21/602

\* cited by examiner

*Primary Examiner* — Izunna Okeke
(74) *Attorney, Agent, or Firm* — Fogarty LLP

(57) ABSTRACT

An information handling system ransomware protection device has a ransomware protection engine that implements secure snapshot policies in a domain of a storage device by taking a secure snapshot of a data object, by creating a point in time image of a storage object and retaining the point in time image of the storage object until a retention timer has expired. The ransomware protection engine also implements snapshot virtualization in the domain of the storage device by mapping the secure snapshot, and may implement vault semantics and operational controls to data in the domain of the storage device as management functions of the secure snapshot. The ransomware protection device may be, or include, an application specific integrated circuit that includes the ransomware protection engine and is coupled to, or in, the storage device, or a memory controller of the storage device may include the ransomware protection engine.

19 Claims, 11 Drawing Sheets

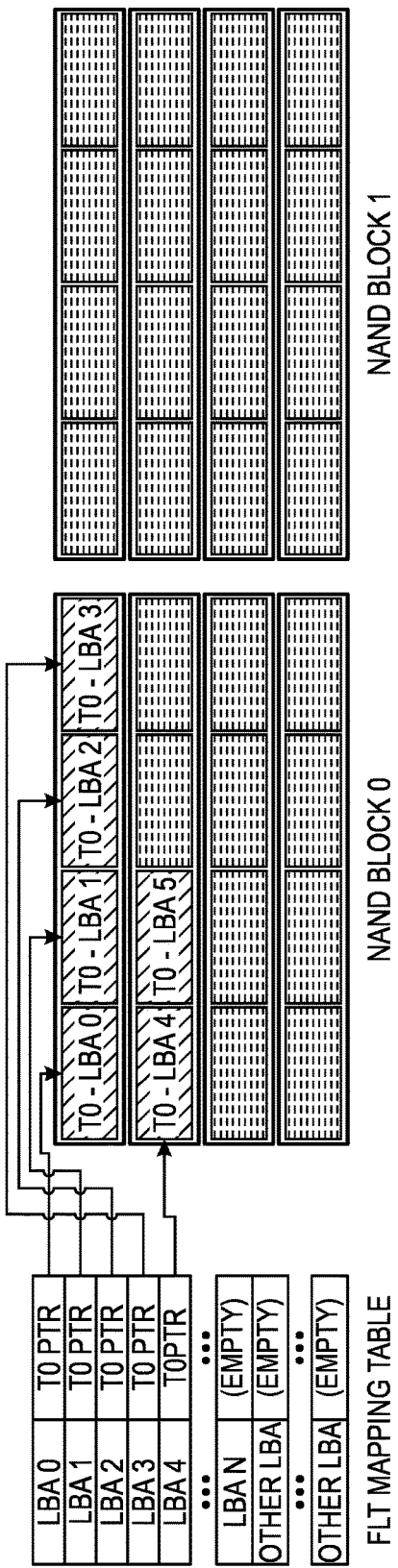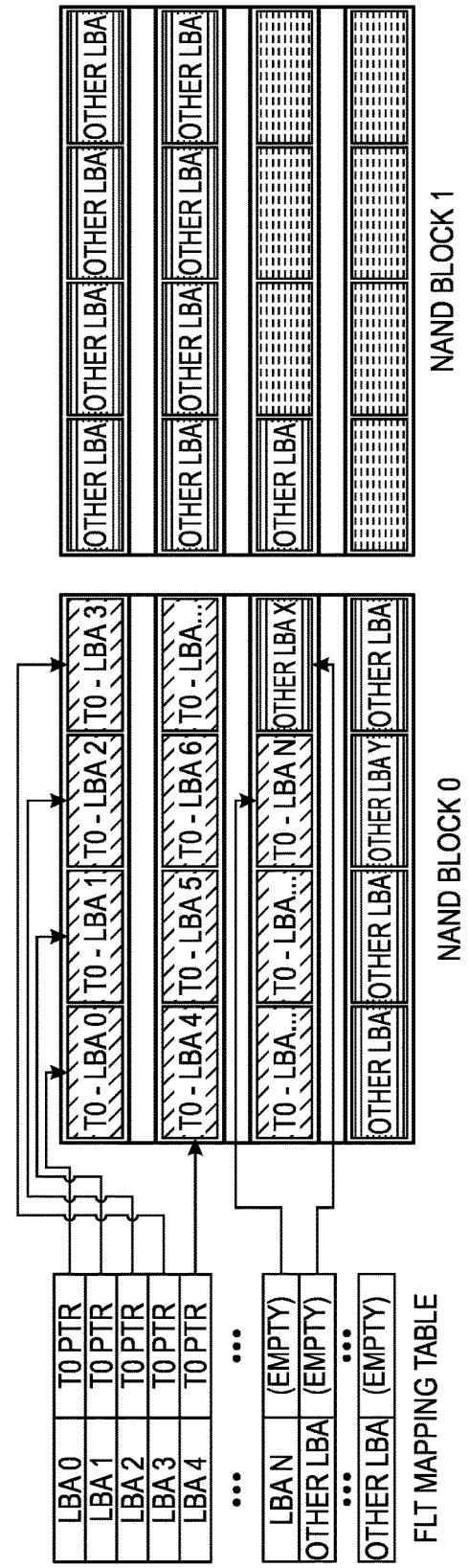

SYSTEMS AND METHODS FOR PROTECTING INFORMATION HANDLING SYSTEMS USING A RANSOMWARE PROTECTION STORAGE DEVICE

CROSS-REFERENCE TO RELATED APPLICATIONS

This disclosure is related to U.S. patent application Ser. No. 18/050,622, entitled Ransomware Protection Systems and Methods Leveraging Smart Network Interface Controllers, U.S. patent application Ser. No. 18/050,643, entitled Systems and Methods for Protecting Information Handling System Boot Using Smart Network Interface Controllers, and U.S. patent application Ser. No. 18/050,878, entitled Pave and/or Repave Systems and Methods Using Ransomware Protection Smart Network Interface Controller or Ransomware Protection Storage Device Secure Snapshots, all of which are filed concurrent herewith, on Oct. 28, 2022, and each of which are incorporated herein by reference.

FIELD

This disclosure relates generally to Information Handling Systems (IHSs), more specifically to protecting IHSs using a ransomware protection storage device, and particularly to protecting end-point devices (end-point IHSs) with a ransomware protection storage device.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Ransomware is an ever-evolving form of malware designed to encrypt files on a device, rendering any files and the systems that rely on them unusable and/or that threatens to publish the victim's data. Malicious actors then demand ransom in exchange for decryption. Ransomware is a type of malware from cryptovirology. While some simple ransomware may lock the system without damaging any files, more advanced malware uses a technique called cryptoviral extortion. It encrypts the victim's files, making them inaccessible, and demands a ransom payment to decrypt them. Recovering the files without the decryption key may be impossible, from a practical standpoint. Difficult to trace digital currencies such as paysafecard or cryptocurrency are typically demanded for payment of ransoms, making tracing and prosecuting the perpetrators difficult. Ransomware attacks are typically carried out using a Trojan file disguised as a legitimate file that the user is tricked into downloading or opening when it arrives as an email attachment. However, a worm may be used that travels automatically between computers without user interaction.

End-point devices including but not limited to laptops and Internet of Things (IoT) devices are susceptible to ransomware attacks. There are many types of ransomware attacks. Some focus on encrypting the data and others on encrypting the boot device by either encrypting the entire device, critical portions of the device such as the master boot record, or the or the Unified Extensible Firmware Interface (UEFI) boot partition boot partition. There are existing techniques that focus on protecting the data. However, for end-point devices, if the boot path is compromised, time consuming manual intervention is required to restore the end point to an operational state before the application data can be restored.

SUMMARY

Embodiments of systems and methods for protecting Information Handling Systems (IHSs) using a ransomware protection storage device are described. In an illustrative, non-limiting example an IHS ransomware protection device includes a ransomware protection engine. The ransomware protection engine implements secure snapshot policies in a domain of a storage device by taking a secure snapshot of a data object, by creating a point in time image of a storage object and retaining the point in time image of the storage object until a retention timer has expired. The ransomware protection engine also implements snapshot virtualization in the domain of the storage device by mapping the secure snapshot, and the ransomware protection engine may implement vault semantics and operational controls to data in the domain of the storage device by applying the vault semantics and operational controls to data as management functions of the secure snapshot.

The IHS ransomware protection device may be the storage device itself and the storage device may include an Application Specific Integrated Circuit (ASIC) that includes the ransomware protection engine. Alternatively, the IHS ransomware protection device may be an ASIC that includes the ransomware protection engine, and that is coupled to the storage device. The IHS may include the ASIC, with the ASIC coupled to the storage device by the IHS.

IHS ransomware protection device may be the storage device itself, where a memory controller of the storage device includes the ransomware protection engine.

The ransomware protection engine may also implement ransomware detection in the domain of the storage device by implementing inline ransomware attack detection, and/or implementing near-line ransomware attack detection, using periodic snapshots and evaluating probability of a ransomware attack based, at least in part, on a delta change set in consecutive snapshots. The ransomware protection engine may also stop incoming write and take the secure snapshot, in response to detection of a ransomware attack.

Thusly, an IHS ransomware protection method may include implementing, by storage device ransomware protection logic, secure snapshot policies in a domain of a storage device by taking a secure snapshot of a data object, comprising creating a point in time image of a storage object and retaining the point in time image of the storage object until a retention timer has expired, implementing, by the storage device ransomware protection logic, snapshot virtualization in the domain of the storage device by mapping the secure snapshot. The storage device ransomware protection logic may also implement vault semantics and operational controls to data in the domain of the storage device by applying the vault semantics and operational controls to data as management functions of the secure snapshot.

The storage device ransomware protection logic may be a set of commands to create the snapshot with the retention time, delete the snapshot with proper authentication, and map the secure snapshot to a namespace. Creating the secure snapshot may include creating, by snapshot virtualization logic, in the storage device ransomware protection logic, a secure snapshot identifier and a mapping for the secure snapshot, preserving a view of the data object as of the point in time the secure snapshot is taken. Creating the secure snapshot of the boot device may include using a snapshot virtualization and mapping of the storage device ransomware protection logic, to create the secure snapshot of the boot device while the boot device is in a known good state. Secure snapshot access may be implemented by creating the secure snapshot as an object in the storage device ransomware protection logic and mapping the secure snapshot to a storage device namespace, as a target device for discovery by the IHS.

Additionally, or alternatively a method for protecting boot of an IHS using the storage device ransomware protection logic of the IHS may include the storage device ransomware protection logic of an IHS created a secure snapshot of the IHS's boot device. The storage device ransomware protection logic may create a secure alternate boot device on each boot of the IHS, and export the secure alternate boot device (and boot device) to the basic input/output system of the IHS. A boot order of the IHS is configured with the secure alternate boot device immediately after the boot device in the boot order. For example, the basic input/output system of the IHS may discover both the boot device and the secure alternate boot device. In response to the IHS failing to boot from the boot device, the IHS will then boot from the secure alternate boot device.

Creating the secure alternate boot device on each boot of the IHS may include the storage device ransomware protection logic creating a read and writeable snapshot from the secure snapshot of the IHS boot device. Then on each subsequent boot of the IHS, the read and writeable snapshot for the prior boot may be deleted and a new read and writeable snapshot may be created from a secure snapshot of the IHS boot device from the subsequent boot of the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIGS. 6 through 10 are block diagrams progressively showing implementation of snapshot virtualization in a flash memory file system by a logical-device interface controller, according to some embodiments.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may, in accordance with embodiments of the present systems and methods, be a personal computer (e.g., desktop or laptop), tablet computer, mobile device (e.g., personal digital assistant (PDA) or smart phone), server (e.g., blade server or rack server), a network storage device, Internet of Things (IoT) device, or other end-point device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Embodiments of the present systems and methods are directed to protecting IHSs using a ransomware protection storage device, and particularly to protecting end-point devices (end-point IHSs), such as, by way of example, laptops and IoT devices, with a ransomware protection storage device, such as, by way of example, an M.2 Solid-State Disk (SSD), or the like.

Figure 1:
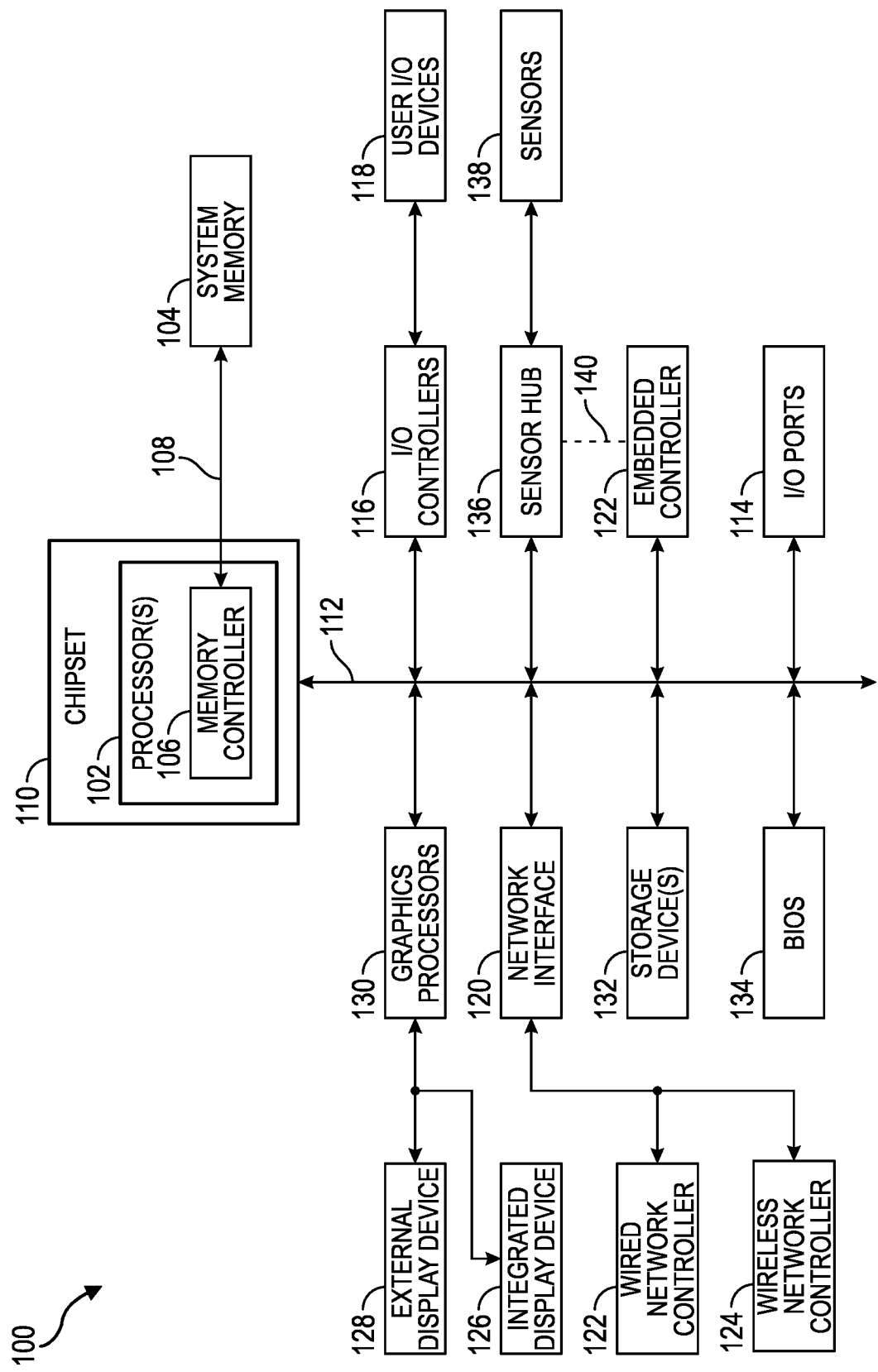
FIG. 1 is a block diagram illustrating components of an example of an Information Handling System (IHS), with which embodiments of the present systems and methods for protecting IHSs using a ransomware protection storage device may be employed, according to some embodiments.

FIG. 1 is a block diagram of an example of internal components of IHS 100, according to some embodiments. As shown, IHS 100 includes one or more processors 102, such as a Central Processing Unit (CPU), that execute code retrieved from system memory 104. Although IHS 100 is illustrated with a single processor 102, other embodiments may include two or more processors, that may each be configured identically, or to provide specialized processing operations. Processor(s) 102 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor(s) 102 includes memory controller 106 that may be implemented directly within the circuitry of processor(s) 102, or memory controller 106 may be a separate integrated circuit that is located on the same die as processor(s) 102. Memory controller 106 may be configured to manage the transfer of data to and from the system memory 104 of IHS 100 via high-speed memory interface 108. System memory 104 coupled to processor(s) 102 provides processor(s) 102 with a high-speed memory that may be used in the execution of computer program instructions by processor(s) 102. Accordingly, system memory 104 may include memory components, such as static RAM (SRAM), dynamic RAM (DRAM), NAND Flash memory, suitable for supporting high-speed memory operations by processor(s) 102. In certain embodiments, system memory 104 may combine both persistent, non-volatile memory and volatile memory. In certain embodiments, system memory 104 may include multiple removable memory modules.

IHS 100 utilizes chipset 110 that may include one or more integrated circuits that are connected to processor(s) 102. In the embodiment of FIG. 1, processor(s) 102 is depicted as a component of chipset 110. In other embodiments, all of chipset 110, or portions of chipset 110 may be implemented directly within the integrated circuitry of processor(s) 102. Chipset 110 provides processor(s) 102 with access to a variety of resources accessible via bus 112. In IHS 100, bus 112 is illustrated as a single element. Various embodiments may utilize any number of separate buses to provide the illustrated pathways served by bus 112.

In various embodiments, IHS 100 may include one or more I/O ports 114 that may support removeable couplings with various types of external devices and systems, including removeable couplings with peripheral devices that may be configured for operation by a particular user of IHS 100. For instance, I/O ports 114 may include USB (Universal Serial Bus) ports, by which a variety of external devices may be coupled to IHS 100. In addition to or instead of USB ports, I/O ports 114 may include various types of physical I/O ports that are accessible to a user via the enclosure of IHS 100.

In certain embodiments, chipset 110 may additionally utilize one or more I/O controllers 116 that may each support the operation of hardware components such as user I/O devices 118 that may include peripheral components physically coupled to I/O port 114 and/or peripheral components that are wirelessly coupled to IHS 100 via network interface 120. In various implementations, I/O controller 116 may support the operation of one or more user I/O devices 118 such as a keyboard, mouse, touchpad, touchscreen, microphone, speakers, camera and other input and output devices that may be coupled to IHS 100. User I/O devices 118 may interface with an I/O controller 116 through wired or wireless couplings supported by IHS 100. In some cases, I/O controllers 116 may support configurable operation of supported peripheral devices, such as user I/O devices 118.

As illustrated, a variety of additional resources may be coupled to processor(s) 102 of IHS 100 through chipset 110. For instance, chipset 110 may be coupled to network interface 120 that may support different types of network connectivity. IHS 100 may also include one or more Network Interface Controllers (NICs) 122 and 124, each of which may implement the hardware required for communicating via a specific networking technology, such as BLUETOOTH, in accordance with various embodiments of the present systems and methods, Wi-Fi, Ethernet and mobile cellular networks (e.g., CDMA, TDMA, LTE). Network interface 120 may support network connections by wired network controllers 122 and wireless network controllers 124. Each network controller 122 and 124 may be coupled via various buses to chipset 110 to support different types of network connectivity, such as the network connectivity utilized by IHS 100.

As illustrated, IHS 100 may support integrated display device 126, such as a display integrated into a laptop, tablet, 2-in-1 convertible device, or mobile device. IHS 100 may also support use of one or more external displays 128, such as external monitors that may be coupled to IHS 100 via various types of couplings, such as by connecting a cable from the external display 128 to external I/O port 128 of the IHS 100. One or more display devices 126 and/or 128 coupled to IHS 100 may utilize LCD, LED, OLED, or other display technologies. Each display device 126 and 128 may be capable of receiving touch inputs such as via a touch controller that may be an embedded component of display device 126 and/or 128 or graphics processor 130, or it may be a separate component of IHS 100 accessed via bus 112. In some cases, power to graphics processor 130, integrated display device 126 and/or external display 128 may be turned off or configured to operate at minimal power levels in response to IHS 100 entering a low-power state (e.g., standby). In certain scenarios, the operation of integrated displays 126 and external displays 128 may be configured for a particular user. For instance, a particular user may prefer specific brightness settings that may vary the display brightness based on time of day and ambient lighting conditions. As such, chipset 110 may provide access to one or more display device(s) 126 and/or 128 via graphics processor 130. Graphics processor 130 may be included within a video card, graphics card or within an embedded controller installed within IHS 100. Additionally, or alternatively, graphics processor 130 may be integrated within processor(s) 102, such as a component of a system-on-chip (SoC). Graphics processor 130 may generate display information and provide the generated information to one or more display device(s) 126 and/or 128, coupled to IHS 100.

Chipset 110 also provides processor(s) 102 with access to one or more storage devices 132. In various embodiments, storage device 132 may be integral to IHS 100 or may be external to IHS 100. In certain embodiments, storage device 132 may be accessed via a storage controller that may be an integrated component of the storage device. Storage device 132 may be implemented using any memory technology allowing IHS 100 to store and retrieve data. For instance, storage device 132 may be a magnetic hard disk storage drive or a solid-state storage drive. In certain embodiments, storage device 132 may be a system of storage devices, such as a cloud system or enterprise data management system that is accessible via network interface 120. Generally speaking, "M.2" is a specification for internally mounted computer expansion cards and associated connectors. The M.2 specification supports Non-Volatile Memory express (NVMe) as the logical device interface for M.2 PCI Express SSDs. Embodiments of the present systems and methods are described herein with respect to an M.2 SSD, or the like, which is typically a NVMe device connected to a PCIe bus (112).

As illustrated, IHS 100 also includes Basic Input/Output System (BIOS) 134 that may be stored in a non-volatile memory accessible by chipset 110 via bus 112. Upon powering or restarting IHS 100, processor(s) 102 may utilize BIOS 134 instructions to initialize and test hardware components coupled to the IHS 100. BIOS 134 instructions may also load an OS (e.g., WINDOWS, MACOS, iOS, ANDROID, LINUX, etc.) for use by IHS 100. BIOS 134 provides an abstraction layer that allows the operating system to interface with the hardware components of the IHS 100. The Unified Extensible Firmware Interface (UEFI) was designed as a successor to BIOS. As a result, many IHSs utilize UEFI in addition to or instead of a BIOS. As used herein, BIOS is intended to also encompass UEFI. IHS firmware (UEFI or BIOS), or the like, may enable a user to configure a "boot order." The IHS will try to boot from a first indicated device, and if this fails, the IHS will attempt to boot from the next indicated device, etc.

As illustrated, certain IHS 100 embodiments may utilize sensor hub 136 capable of sampling and/or collecting data from a variety of hardware sensors 138. Sensors may provide access to data describing environmental and operating conditions of IHS 100 (e.g., accelerometers, gyroscopes, hinge sensors, rotation sensors, hall effect sensors, temperature sensors, voltage sensors, current sensors, IR sensors, photosensors, proximity sensors, distance sensors, magnetic sensors, microphones, ultrasonic sensors, etc.). Generally, in various implementations, processor 102 may receive and/or produce context information using sensors 138 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., holding a stylus, or the like), a time of day, software application(s) under execution in focus for receiving keyboard input, whether IHS 100 is inside or outside of a carrying bag, ambient lighting, a battery charge level, whether IHS 100 is operating from battery power or is plugged into an AC power source (e.g., whether the IHS is operating in AC-only mode, DC-only mode, or AC+DC mode), a power consumption of various components of IHS 100 (e.g., CPU 102, GPU 130, system memory 104, etc.), an operating temperature of components of IHS 100, such as CPU temperature, memory module temperature, etc. In certain embodiments, sensor hub 136 may be an independent microcontroller or other logic unit that is coupled to the motherboard of IHS 100. Sensor hub 136 may be a component of an integrated system-on-chip incorporated into processor 102, and it may communicate with chipset 110 via a bus connection such as an Inter-Integrated Circuit (I2C) bus or other suitable type of bus connection. Sensor hub 136 may also utilize an I2C bus for communicating with various sensors supported by IHS 100.

As illustrated, IHS 100 may utilize embedded controller (EC) 140, which may be a motherboard component of IHS 100 and may include one or more logic units. In certain embodiments, EC 140 may operate from a separate power plane from the main processors 102 and thus the OS operations of IHS 100. Firmware instructions utilized by EC 140 may be used to operate a secure execution system that may include operations for providing various core functions of IHS 100, such as power management, management of operating modes in which IHS 100 may be physically configured and support for certain integrated I/O functions. In some embodiments, EC 140 and sensor hub 136 may communicate via an out-of-band signaling pathway or bus 124.

In various embodiments, IHS 100 may not include each of the components shown in FIG. 1. Additionally, or alternatively, IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 102 as an SoC. Additionally, or alternatively, the subject (endpoint) IHS (e.g., an IoT device) may be, or at least employ, a single board computer or the like.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

A person of ordinary skill will recognize that IHS 100 of FIG. 1 is only one example of a system in which the certain embodiments may be utilized. Indeed, the embodiments described herein may be used in various further electronic devices, such as network router devices, televisions, custom telecommunications equipment for special purpose use, etc. That is, certain techniques described herein are in no way limited to use with IHS 100 as illustrated in FIG. 1.

End-point devices, and the like, including but not limited to laptops and IoT devices, are susceptible to ransomware attacks. As noted, there are many types of ransomware attacks. Some focus on encrypting the data and others on encrypting the boot device by either encrypting the entire device, critical portions of the device such as the master boot record, or the or the Unified Extensible Firmware Interface (UEFI) boot partition boot partition. Comprehensive protection of an end-point operating environment and data, in accordance with embodiments of the present systems and methods, may be an essential part of an overall ransomware protection and recovery scheme. As also noted, existing ransomware protection and recovery techniques tend to focus on protecting the data. However, for end-point devices, if the boot path is compromised, time consuming manual intervention is required to restore the end point to an operational state before the application data can be restored. Embodiments of the present systems and methods protect end-point devices (end-point IHSs) using a ransomware protection storage device, to protect not only data, but also end-point device boot.

Figure 2:
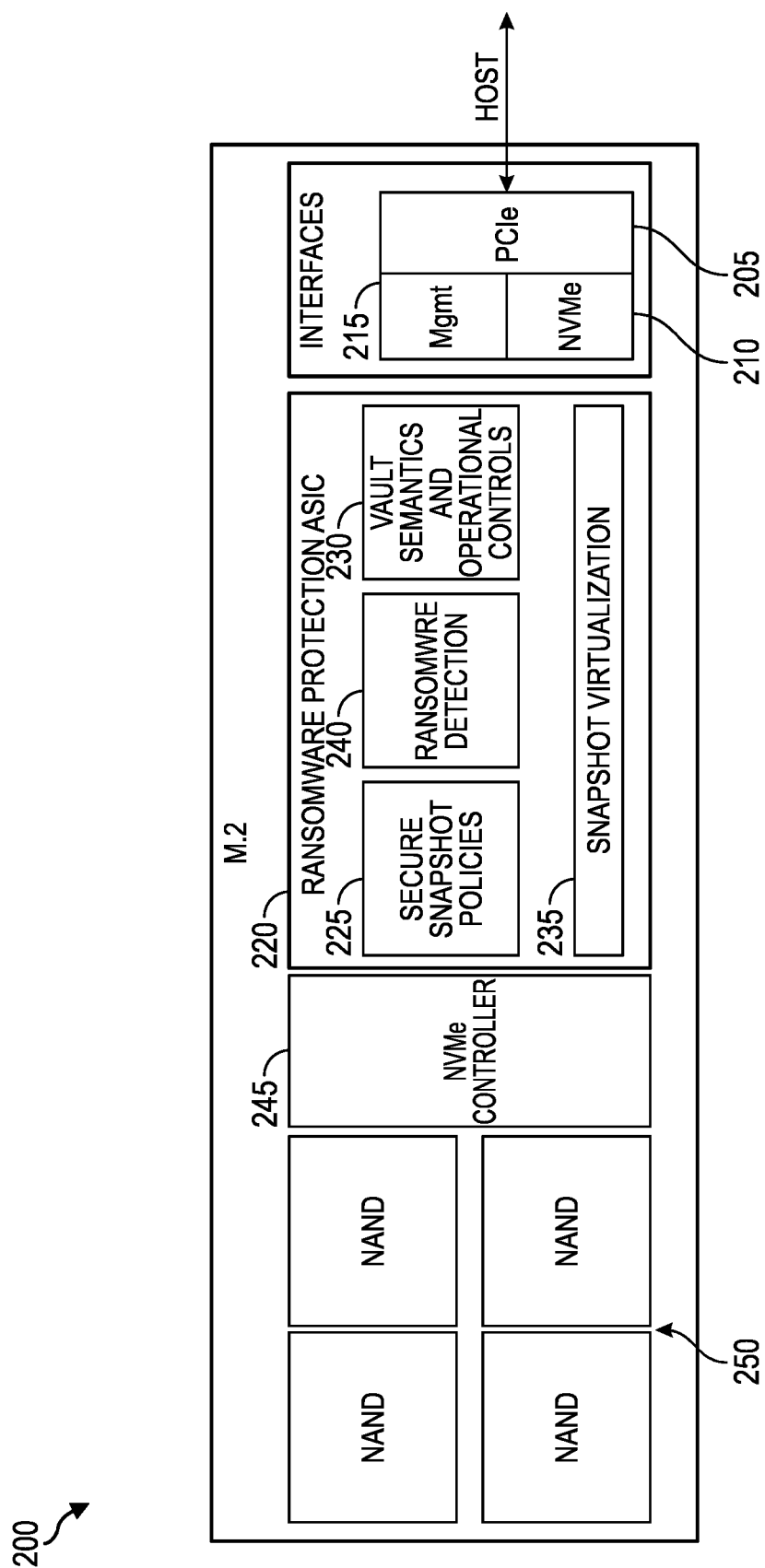
FIG. 2 is a block diagram illustrating an example ransomware protection storage device, which may be employed in the present systems and methods for protecting IHSs using a ransomware protection storage device, according to some embodiments.
Figure 3:
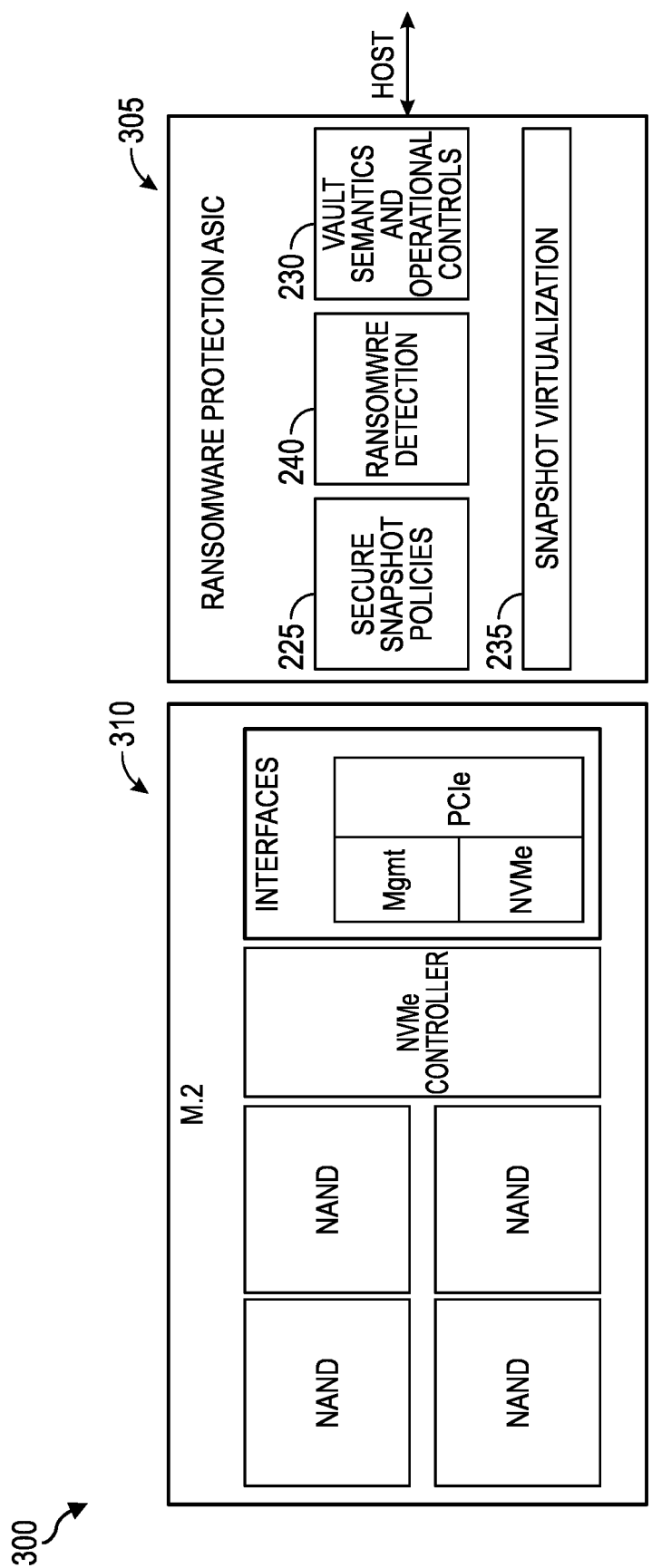
FIG. 3 is a block diagram illustrating another example implementation providing ransomware protection using a ransomware protection Application Specific Integrated Circuit (ASIC) with a storage device, according to some embodiments.
Figure 4:
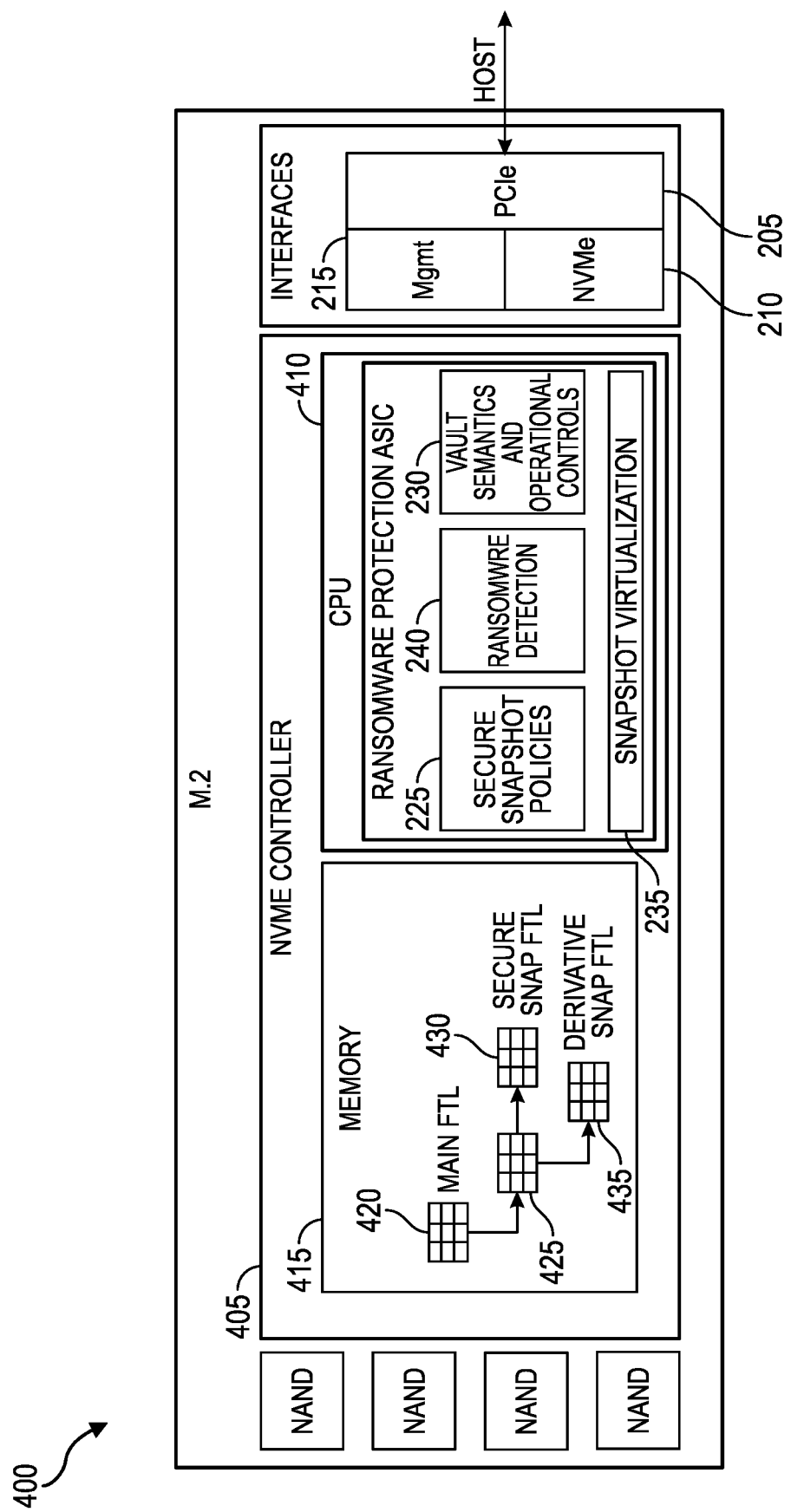
FIG. 4 is a block diagram illustrating a further example implementation providing ransomware protection using ransomware protection computational storage, according to some embodiments.

FIG. 2 is a block diagram illustrating example ransomware protection storage device 200, which may be employed in the present systems and methods for protecting IHSs using a ransomware protection storage device, according to some embodiments. FIG. 3 is a block diagram illustrating other example implementation 300 for providing ransomware protection using ransomware protection such as through use of separate ransomware protection Application Specific Integrated Circuit (ASIC) 305 with storage device 310, according to some embodiments. FIG. 4 is a block diagram illustrating further example implementation 400 for providing ransomware protection using ransomware protection computational storage, according to some embodiments. Each of these implementations of embodiments of the present systems and methods include common functionality for ransomware protection, as discussed below. For example, some embodiments (e.g., 200 and 400) of the present systems and methods build ransomware protection into a space constrained storage device, such as, way of example, for illustrative purpose, an M.2 SSD. However, embodiments of the present systems and methods is not limited to any particular form factor, and embodiments of the present systems and methods may be implemented in, and/or with respect to other storage form factors, such as Serial AT Attachment (SATA), E1.S, Ball Grid Array (BGA), etc. However, the term "M.2" or "storage device" may be used throughout this disclosure to indicate any such (space constrained) flash memory storage device, or the like. Further, embodiments of the present systems and methods may be used with respect or in (physical hard disk drives or the like, as well.

Many end-point devices such as laptops, IoT gateways, IoT devices, and the like, use M.2 as their boot device and primary storage. As used herein, a "secure snapshot" is a data snapshot that cannot be deleted until a retention timer expires. Embodiments of the present systems and methods use secure snapshots to protect both the boot mechanism and the application data of an end-point device (IHS). Implementing secure snapshot and secure snapshot policies, in accordance with embodiments of the present systems and methods, in the M.2 provides a convenient tool to protect a wide range of end-point devices. Thus, rather using a SmartNIC or (other) DPU to protect data and/or boot of the IHS, this mechanism implements the protection in an M.2, or the like, and thereby streamlines deployment of ransomware protection, particularly in end-point devices, which are typically tight on space and cost sensitive. Embodiments of the present systems and methods, such as through implementing the present systems and methods in an M.2, provide many benefits, such as detailed below.

By implementing the preset systems and methods in an M.2, or the like, the ransomware protection is provided in a centralized fashion. An M.2, or the like, provides a convenient central point to apply ransomware protection techniques, as all data being stored and retrieved by the IHS that employs an M.2, or the like, is from that an M.2, or the like. Additionally, embodiments of the present systems and methods are OS and virtualization agnostic. That is, since an M.2, or the like, provides storage in the IHS (end-point device) through the IHS buses, such as PCIe, SATA, or the like, as discussed above, OSs or virtualization platforms installed on the IHS (end-point device) discover storage devices through well-established standard storage protocols. In various embodiments of the present systems and methods, a (small) OS-specific driver, or the like, and (a) software module(s), or the like, may be employed as a management interface, as discussed in greater detail below. Also, embodiments of the present systems and methods separate the security domain and the IHS's credentials. Thus, under embodiments of the present systems and methods, since the M.2, or the like, is a separate compute complex and has separate management credentials, an attacker that has gained access to the IHS (end-point device) will not be able to alter the integrity of the M.2 ransomware protection and recovery functions, or the like. Embodiments of the present systems and methods secure storage devices that are ever-increasing in size. With advances in flash technologies, the amount of data stored within the M.2 form factor, or the like, is growing at a rapid pace, which provides a similarly increasing value to a ransomware attacker.

As noted, FIG. 2 is a block diagram illustrating example ransomware protection storage device 200, specifically a ransomware protection M.2, which may be employed in the present systems and methods for protecting IHSs using a ransomware protection storage device, according to some embodiments. An M.2 is typically a NVMe device connected to an IHS PCIe bus, such as via PCIe interface 205, or a SATA device connected to a SATA controller. In the block diagram of FIG. 2, an NVMe device is shown as an example. From a logic standpoint, there are two interfaces, data path 210, and management interface path 215, for management commands. Data path 210 may, in accordance with embodiments of the present systems and methods, operate under standard NVMe protocols. Management path 215 may be employed in accordance with embodiments of the present systems and methods, and can be in-band, via PCIe using NVMe Management Interface (NVMe-MI) protocols, or out-of-band such as via 120. In accordance with embodiments of the present systems and methods, management commands may require authentication to separate the management domain from the end-point device operating system.

In the M.2 form factor, or the like, there are often limitations on space, and thermal and cost considerations. For a compact deployment footprint, embodiments of the ransomware protection logic for the present systems and methods may be implemented as Ransomware Protection ASIC (RPA) 220, such as, as a ransomware protection engine. Ransomware protection ASIC 220 includes and implements secure snapshot policies 225, vault semantics and operational controls 230, snapshot virtualization 235, and, in some embodiments, ransomware detection engine 240 (depending on cost and/or space considerations). Ransomware protection ASIC 220 can be implemented as part of NVMe controller 245 for NAND memory 250 (such as discussed below, with respect to FIG. 4) or as a separate ASIC with embedded processor, such as an ARM® processor, or the like, and memory sub-system, such as in FIGS. 2 and 3.

Secure snapshot policy engine 225 implements secure snapshots, which are each a point in time image of a storage object. This secure snapshot cannot be deleted until a retention timer has expired. In embodiments of the present systems and methods, the purpose of a secure snapshot is to ensure that this data can be restored in case it is encrypted or destroyed by a cyber-attack. While the snapshot feature is provided by snapshot virtualization 235, the policies of when the secure snapshots are taken are hosted in secure snapshot policy engine module 225.

Vault semantics and operational controls 230 ensure that data is locked and isolated from access by an air gap, or the like. Updates to the vault are only allowed at specific scheduled time slots. In the context of using the present ransomware protection storage device to protect end-point devices (end-point IHSs), these vault operational controls can be applied to the data in the secured domain, as management functions for secure snapshots to implement aspects of the present systems and methods. These operational controls include, but are not limited to, fine grain access control, defining a security officer role, time-based or interface-based management command restrictions, etc.

Snapshot virtualization 235 performs mapping, such as at high-speed, by way of example using a state machine. As noted, a snapshot of a device is the data in a point in time when the snapshot is taken. Conceptually, there is a mapping layer that represents the logical blocks to physical blocks mapping. As an example, in the case of a new write to the device after a snapshot is taken, the write is written to a new location and the mapping is updated to point at the new data. The snapshot mapping remains pointing at the old data to reflect on point in time the snapshot was taken. In accordance with embodiments of the present systems and methods, secure snapshot is implemented as a policy on top of this snapshot feature.

As noted, in some embodiments, ransomware detection 240 may be implemented (in ransomware protection ASIC 200), if cost and space permits. The ransomware detection engine will examine data inline or use snapshots delta to detect ransomware attacks, in a near-line manner.

As noted, FIG. 3 is a block diagram illustrating alternate example implementation 300 for providing ransomware protection using ransomware protection such as through use of separate ransomware protection ASIC 305 with storage device 310, according to some embodiments. This alternate approach to integrating ASIC into M.2, or the like, enables deployment of embodiments of the present systems and methods in any environments utilizing M.2, or the like. In alternative implementation 300 separate ransomware protection ASIC 305 is "built-into" (i.e., incorporated as a component of) the IHS and "commodity" (i.e., "off the shelf") M.2 310 is used by the IHS. As noted above, implementation 300 of embodiments of the present systems and methods includes functionality for ransomware protection in common with ransomware protection M.2 200 of FIG. 2, specifically ransomware protection ASIC 305, like ransomware protection ASIC 220, includes and implements secure snapshot policies 225, vault semantics and operational controls 230, snapshot virtualization 235, and, in some embodiments, ransomware detection engine 240 (depending on cost and/or space considerations).

As noted, FIG. 4 is a block diagram illustrating further alternate example implementation in NVMe M.2 400 for providing ransomware protection using ransomware protection computational storage, according to some embodiments. Therein, ransomware protection is implemented as a part of NVMe controller 405, such as, as ransomware protection logic, which may define a ransomware protection engine. The ransomware protection logic is implemented as part of NVMe controller 405, in a computational storage approach. In such an implementation, the ransomware protection logic, including the secure snapshot policies 225, vault semantics and operational controls 230, snapshot virtualization 235, and, in some embodiments, ransomware detection engine 240 (depending on cost and/or space considerations), run on the integrated CPU complex 410, such as a set of ARM® processor cores, or the like in the controller 405, working on local memory 415 to implement snapshot mapping using the Flash Transition Layer (FTL). Some embodiments of the present systems and methods may be implemented in an existing NVMe controller with sufficient processing power. In the illustrated example, main FTL 420 represents the set of blocks of memory 415. The secure snapshot data blocks are representation by secure snapshot mapping 425, a copy of main FTL 420 at the point in time the secure snapshot is taken, providing secure snapshot FTL 430. Derivative read/writable snapshots (such as discussed below with respect to boot protection) are, likewise, represented by derivative snapshot FTL 435, on the same basis as secure snapshot FTL 430.

In many cases, the M.2, or the like, is the only storage device in an IHS (end-point device). While it may be advantageous to, such as in accordance with embodiments of the present systems and methods, to revert a boot device to a last known state, as described below with respect to FIGS. 11 and 12, the application data on the M.2, or the like, is typically updated much more frequently. Thus, (some embodiments) of the present systems and methods create the boot device separate from the application data. In this way, the boot device, which is updated infrequently, can be reverted, as described below with respect to FIGS. 11 and 12, separately from the data. For instance, in an NVMe M.2, a small namespace is created for boot, and (a) separate namespace(s) is (are) created for data. The data namespace(s) may have a separate secure snapshot schedule and policy.

Figure 5:
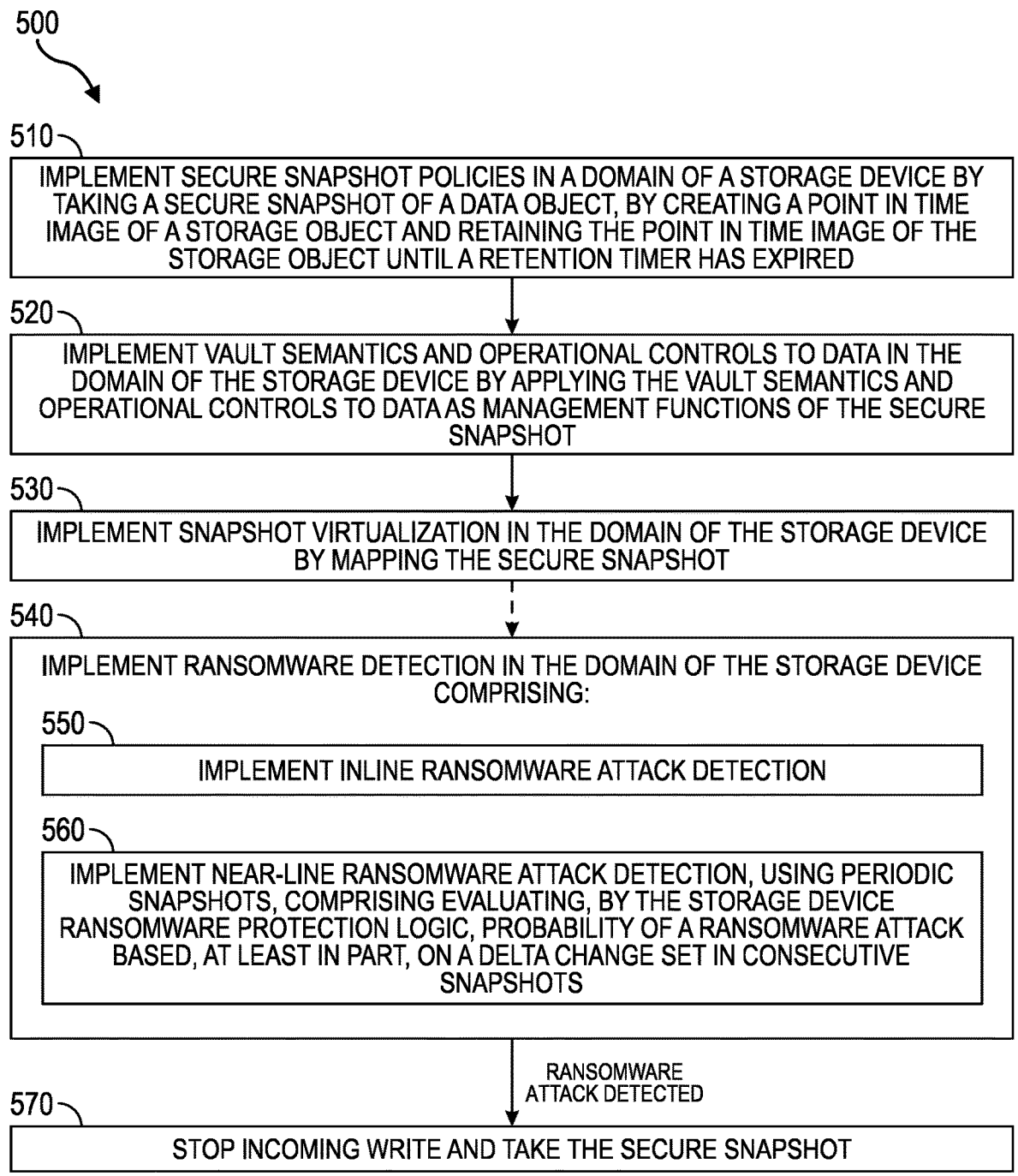
FIG. 5 is a flowchart of an example process for protecting IHSs using a ransomware protection storage device, according to some embodiments.

FIG. 5 is a flowchart of example process 500, secure snapshot operations, for protecting IHSs using a ransomware protection storage device, according to some embodiments. Therein, a set of commands such as create snapshot with retention time, delete with authentication, map snapshot to namespace, etc. are defined to support the secure snapshot function. These commands can be defined as NVMe-MI configuration get/set command opcodes or using the vendor specific identifiers or NVMe-MI vendor specific command opcode.

At 510, storage device ransomware protection logic, such as implemented by the ransomware protection ASIC (220), implements secure snapshot policies in a domain of a storage device by taking a secure snapshot of a data object, by creating a point in time image of a storage object and retaining the point in time image of the storage object until a retention timer has expired.

At 520, the storage device ransomware protection logic, such as implemented by the ransomware protection ASIC (220) ransomware protection engine, implements vault semantics and operational controls to data in the domain of the storage device by applying the vault semantics and operational controls to data as management functions of the secure snapshot.

At 530, the storage device ransomware protection logic, such as implemented by the ransomware protection ASIC (220) ransomware protection engine, implements snapshot virtualization in the domain of the storage device by mapping the secure snapshot.

Thusly, creation of the secure snapshot may include creating, by snapshot virtualization logic, in the storage device ransomware protection logic, a secure snapshot identifier and a mapping for the secure snapshot, preserving a view of the data object as of the point in time the secure snapshot is taken. Hence, in accordance with secure snapshot operations under embodiments of the present systems and methods, a secure snapshot is created, by such as by the snapshot virtualization logic (235) in the ransomware protection ASIC (220). A snapshot identifier and a mapping are created. The mapping is used to preserve the view of the data as of the point in time the snapshot is taken. A secure snapshot is created with a retention time and the snapshot can only be deleted by command or automatically by policy after the retention time expires.

Further, secure snapshot access may be implemented by creating the secure snapshot as an object in the storage device ransomware protection logic and mapping the secure snapshot to a storage device namespace, as a target device for discovery by the information handling system. For example, to facilitate secure snapshot access, a secure snapshot is created as an object in the ransomware protection ASIC (220), and for read/write access, it is mapped to an NVMe namespace and in turn mapping as a target device for discovery by the host. Data blocks of the original device and the snapshots are stored on the space managed by the NVMe controller. This can be done as a linear stop space where the NVMe namespaces are managed by the ransomware protection ASIC (220). Or additional namespaces can be used behind the NVMe controller depending on the detailed implementation of the mapping layer. In accordance with embodiments of the present systems and methods, Secure snapshots are read-only by default, this protects the data. For convenience and/or for application use, a read/writable snapshot can be created on top of the secure snapshot, as a "derivative" (secure) snapshot. In this way, the device representing the read/writable snapshot can function as a normal device. On a reboot, if necessary, the read/writeable snapshot can be deleted and recreated to restore the data to the secure snapshot state.

Optionally, at 540, storage device ransomware protection logic, such as implemented by the ransomware protection ASIC (220) ransomware protection engine, implements ransomware detection in the domain of the storage device, such as by implement inline ransomware attack detection, at 550, and/or implementing near-line ransomware attack detection using periodic snapshots, at 560, by evaluating, by the storage device ransomware protection logic, probability of a ransomware attack based, at least in part, on a delta change set in consecutive snapshots. At 570, incoming writes are stopped, and a secure snapshot of the data is taken, in response to detection of a ransomware attack at 560.

A delete operation of a secure snapshot might not be allowed, except after the aforementioned retention timer expires. However, if such an operation is desired, robust safeguards are placed by embodiments of the present systems and methods. For example, multi-party authentication and authorization where two separate roles such as admin role and security officer role from the operator and one service role from a vendor to consent in an auditable event may be employed, before a secure snapshot can be deleted.

FIGS. 6 through 10 are block diagrams, progressively showing implementation of snapshot virtualization in a flash memory file system, such as by a logical-device interface controller, according to some embodiments of the present stems and methods. An example implementation of snapshot virtualization may be a "write split" approach where a new write to the original device will be written to a new location while the data at the point in time (secure) snapshot is preserved. FIGS. 6 through 10 show FTLs with the present snapshot function implemented.

FIG. 6 shows initial writes without snapshot(s). Therein, data is written to the SSD. For instance, to start, a boot image is shown as written at time T0. The SSD fills a NAND block with the boot image. FTL mapping table entries are updated to point to the physical location in NAND of corresponding data for that Logical Block Address (LBA). FIG. 7 shows continuing writes without snapshot, wherein, for instance, writing of the boot image is completed, then user data is written.

Figure 8:
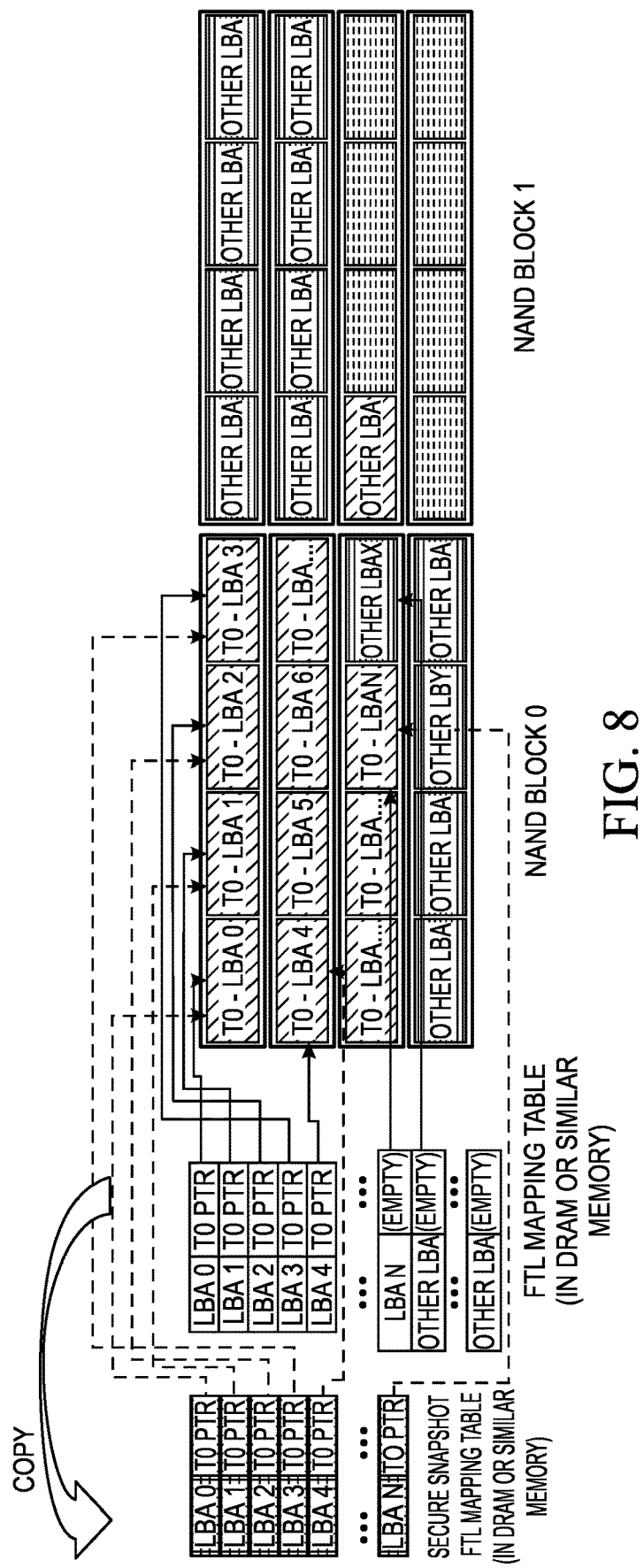

FIG. 8 shows snapshot FTL copy, whereby secured snapshots are created. The SSD receives a command to secure a set of data in its media (which may be a namespace, a range of LBAs a list of LBAs, or the like). As a result, the SSD duplicates the FTL table for the corresponding LBA entries. Such duplication of the FTL table is one implementation, other implementations could be to create such a table or log entries thereof, whenever modification of data in the secured snapshot range is requested.

Figure 9:
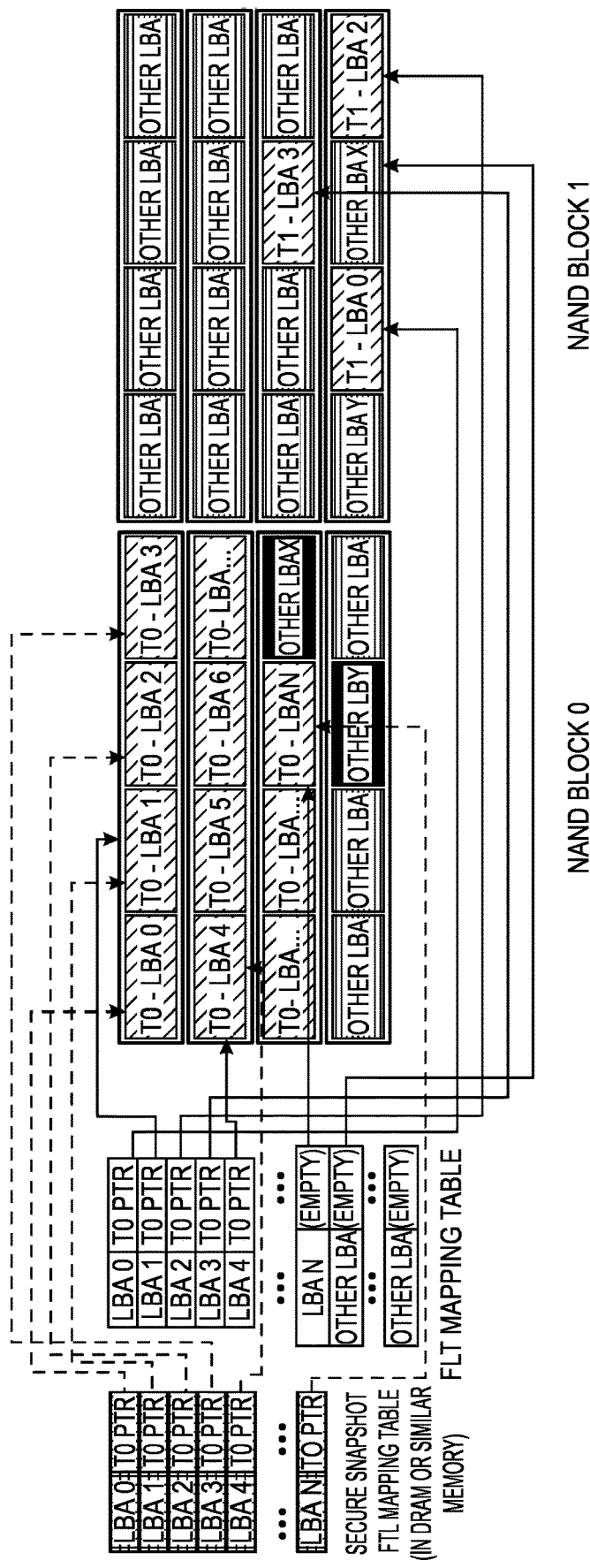

FIG. 9 shows overwrites with (secure) snapshot. For example, eventually, some of the boot image and/or user data is updated. In the illustrated example, boot image LBAs 0, 2, 3 and user data LBAs x and y get new data at time T1. As NAND cannot overwrite in place, the new data is written to a new physical NAND location. The original FTL table is updated to point to the recent data (T1). Old data is only marked invalid if it does not have a pointer associated to it within the "Secured Snapshot FTL Table." In the example below, LBAs 0, 2 and 3 are part of the secured FTL table and so the corresponding NAND locations remain valid. However, LBA x and y are not part of the secured snapshot, those old locations (T0) are marked invalid when the T1 values are written.

Figure 10:
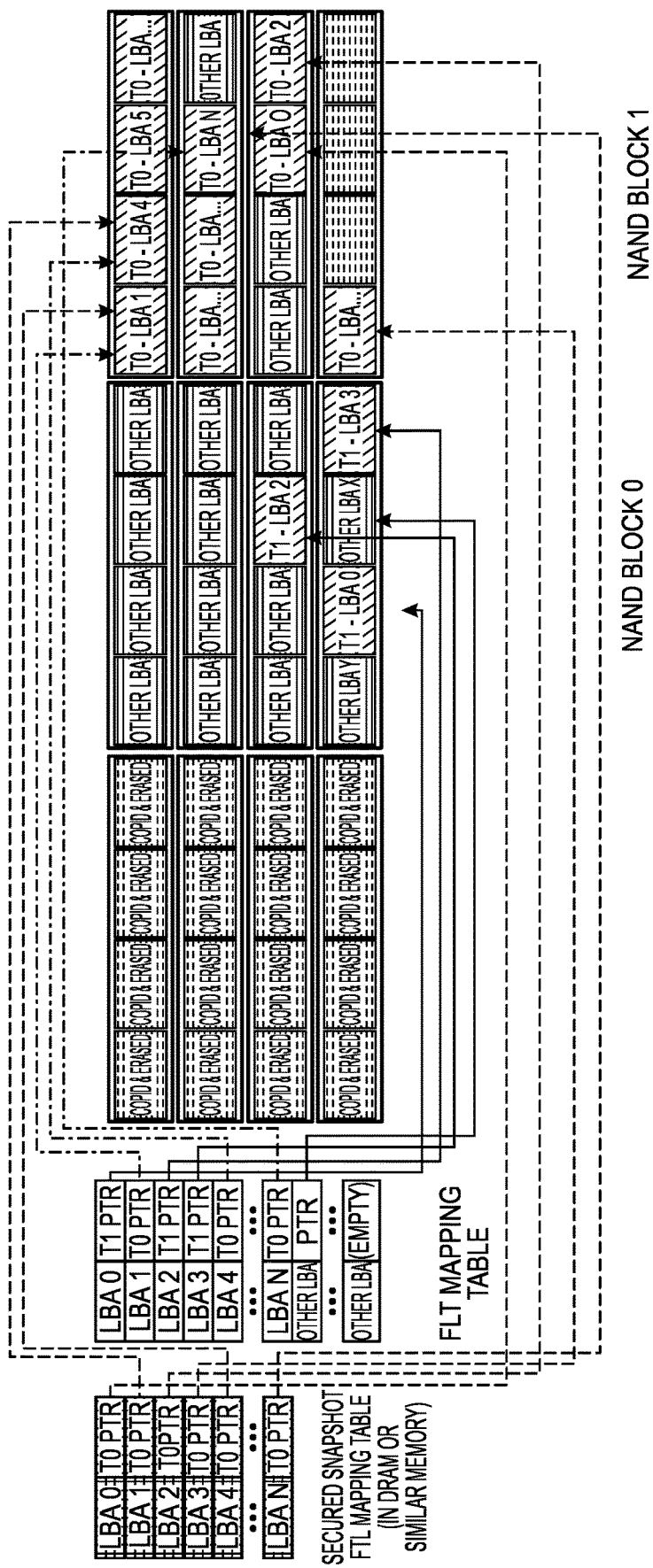

FIG. 10 shows "garbage collection" with (secure) snapshot. Eventually, the SSD may need space and its garbage collection firmware reclaims the space in NAND blocks with invalid data. To that end, (the) garbage collection function(s) copies the data still valid to a new NAND block and erases the old NAND block. FTL is updated to point to new NAND block for corresponding moved data. In the illustrated example, only the T0 values of x and y are lost, these are generally irrevertible. However, all data pointed to by either FTL tables in the NAND block to be erased are properly moved to a new location. This includes the original secured value of LBA 0, 2 and 3. The ordering in the new NAND block may be arbitrary. Some LBAs are shown placed at the end for purposes of illustration. However, in various embodiments, it may be advantageous for the garbage collection functionality to "separate out" the "secured snapshot data" from the other data. This would facilitate placing even further redundancy (e.g., RAID 6 instead of RAID 5; higher ECC) or better data protection (encryption) on the secured snapshot compared to the non-secured part of the data.

Figure 11:
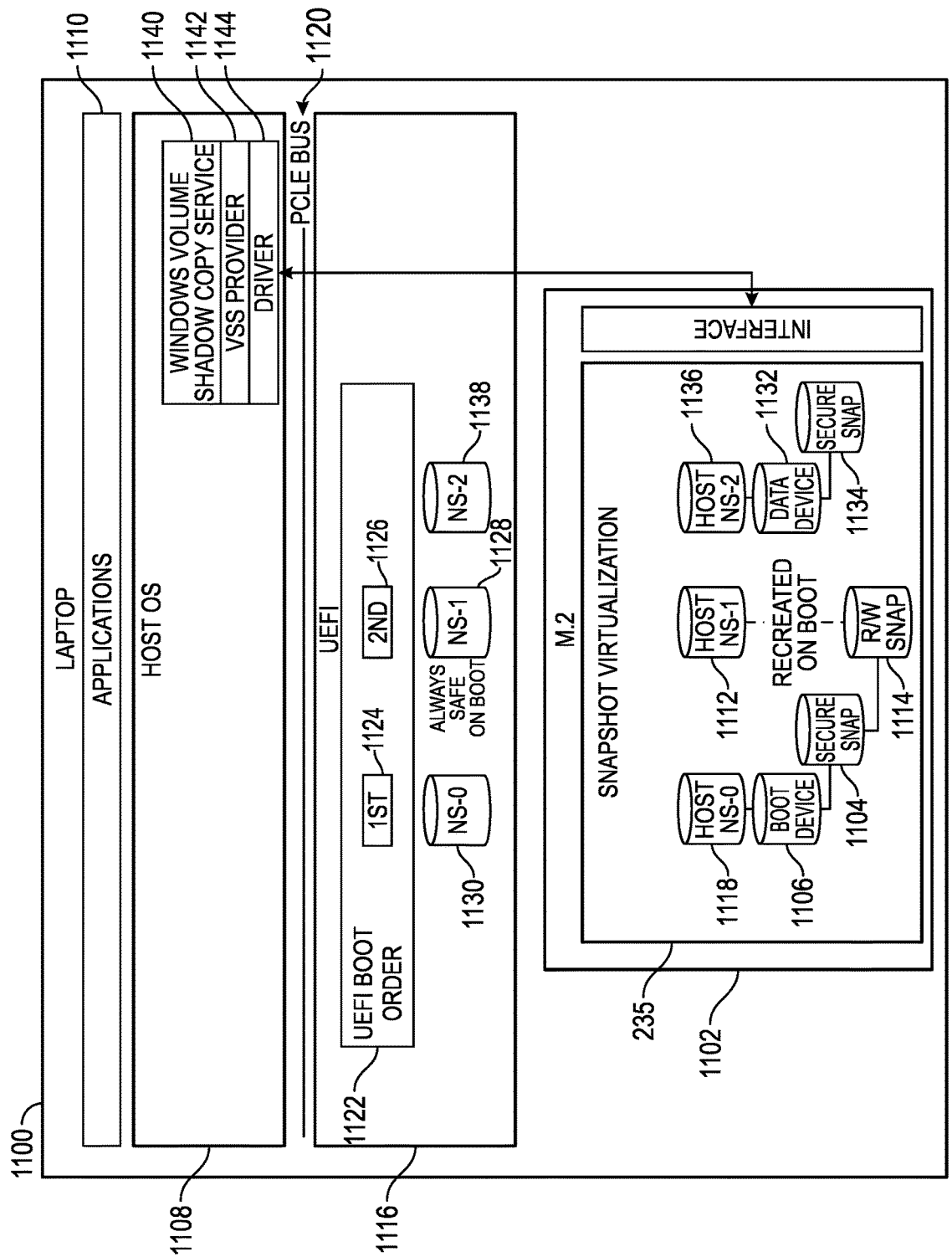
FIG. 11 is a block diagram illustrating example protection of an IHS (end-point device) boot using a ransomware protection storage device, according to some embodiments.
Figure 12:
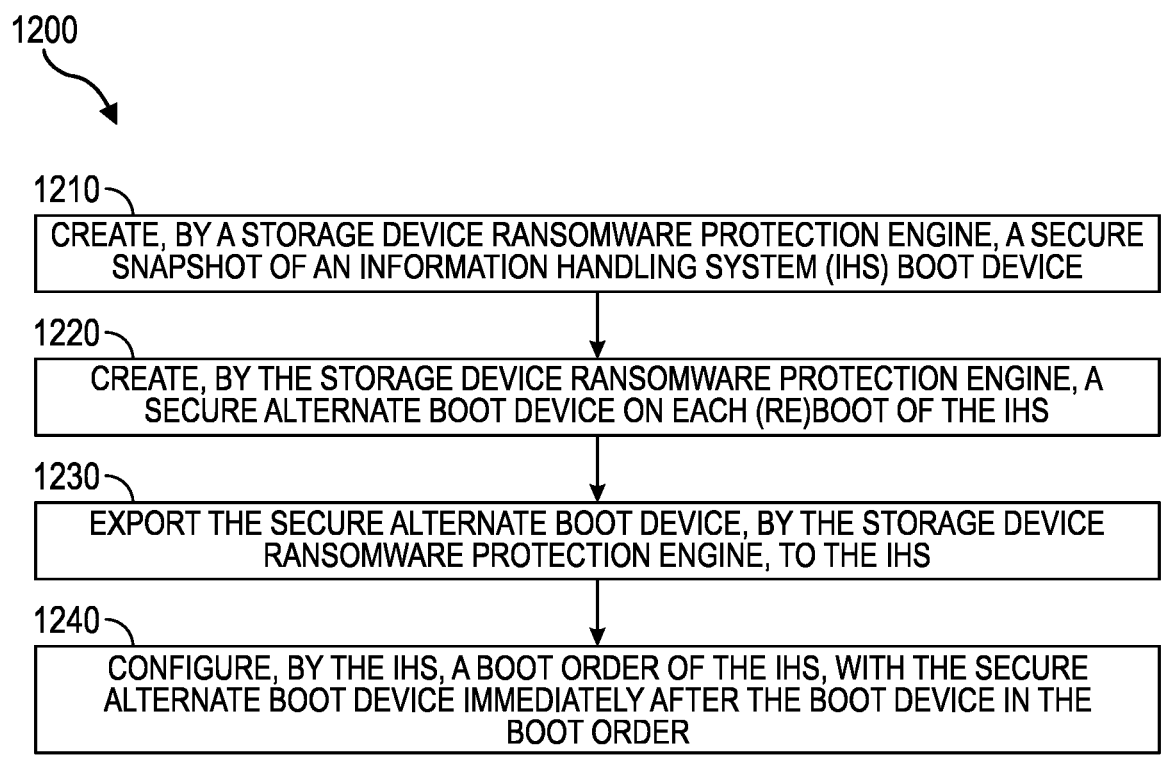
FIG. 12 is a flowchart of an example process for protecting IHS (end-point device) boot using a ransomware protection storage device, according to some embodiments.

FIG. 11 is a block diagram illustrating example protection of protecting the operating environment of an end-point device (IHS), such as by, at least in part, protecting boot of the IHS (end-point device), example laptop IHS 1100, using a ransomware protection storage device, according to some embodiments. FIG. 12 is a flowchart of example process 1200 for protecting the operating environment of an end-point device (IHS), such as by, at least in part, protecting IHS (end-point device) boot using a ransomware protection storage device, according to some embodiments. FIGS. 11 and 12 are described together below. In particular, FIG. 11 shows snapshot example virtualization 235 of an example ransomware protection engine employed in M.2 1102, in accordance with example process 1200 for protecting IHS boot end-point device implementation 1100.

At 1210, boot device secure snapshot 1104 is created by ransomware protection engine snapshot virtualization 235. Specifically, leveraging the snapshot virtualization (235) of the ransomware protection engine (e.g., ransomware protection ASIC 220 or 305, ransomware protection enable NVMe controller 405, or the like), secure snapshot 1104 is created from boot device 1106 while it is in a known good state. This known good state is defined as a state that the IHS (end-point device 1100) can provide a one-hundred percent operating capacity. An example may include having the proper operating system (1108) and versions of applications (1110) installed on end-point device 1100. Subsequent updates to boot device 1106 such as operating system and application upgrades may trigger creation of a new secure snapshot to reflect on the changes.

At 1220, secure alternate boot device 1112 is created on each (re)boot. To such ends, ransomware protection engine snapshot virtualization (235) automatically creates read and writeable snapshot 1114 from secure snapshot 1104. In operation, the IHS boot process and runtime proceeds normally reading and writing to boot device 1106. On any subsequent boot, read and writeable snapshot 1114 is deleted and (re)created to ensure any corrupted or undesirable changes are removed, so as to ensure secure alternate boot device 1112 is always a safe and true image of secure snapshot 1104 at boot time.

At 1230 secure alternate boot device 1112 is exported to UEFI (BIOS) 1116, or the like. That is, ransomware protection engine snapshot virtualization 235 may export both boot device 1106 (as Host NS-0 1118) and secure alternate boot device 1112 (Host NS-1) via (PCIe) bus 1120. The rest of the IHS (laptop 1100) including UEFI (BIOS) 1116 sees both devices in their discoveries.

At 1240, boot order 1122 is configured in UEFI (BIOS) 1116, or the like. Boot order 1122 is a UEFI (BIOS) function, or the like, wherein an administrator (a person or an administrative function with proper access (credentials)) can, typically, configure the order of the devices an IHS boots from. If IHS (end-point device) 1100 fails to boot from one device (e.g., first device 1124), the IHS (end-point device) moves on to boot from the next device in the boot order (e.g., second device 1126). In accordance with embodiments of the present systems and methods, secure alternate boot device 1128 (NS-1), which is UEFI (BIOS) 1116 localstored copy of secure alternate boot device 1112 (Host NS-1), is configured immediately after boot device 1130, UEFI (BIOS) 1116 local-stored copy (NS-0) of boot device 1106 (Host NS-0 1118), in the boot order (1122). In this way, if boot device 1130 (1106/1118) is compromised, IHS (endpoint device) 1100 will automatically boot from secure alternate boot device 1128 (1112/1114/1104).

Thusly, in accordance with embodiments of the present systems and methods, a secured alternate boot device is exposed to the end-point OS on a secure snapshot of the boot device while it is in a known good state. This secure alternate boot device is configured in the UEFI (BIOS) boot order right after the boot device. In a ransomware attack where the boot device is compromised and fails to boot, the alternate boot device will automatically boot. An administrator, or administrative function, may, in accordance with various embodiments of the present systems and methods, be alerted to this event to take appropriate actions while the end-point device (IHS) continues to operate fully using the secure alternate boot device. The administrator, or administrative function, can also restore the data from the data device secure snapshots to recover the data if necessary. In a case where the boot device is bootable but not functional, such as where the device only displays a ransomware note, the administrator, administrative function, or owner of the end-point device (IHS) may, in accordance with embodiments of the present systems and methods, select the secure alternate device as the primary boot device. In accordance with embodiments of the present systems and methods, secure snapshots are immutable and therefore, safe. In order to make a fully functional boot device, a read/write snapshot is created from a secure snapshot. This way, the boot process, operating system, and applications can proceed as normal. On each reboot, the read/write snapshot is recreated. The result is on each boot, the secured alternate boot device is always in a safe, good known state without any ransomware or files encrypted by the ransomware.

As noted above, in many cases, the M.2, or the like, is the only storage device in an IHS (end-point device). While it may be advantageous to, such as in accordance with embodiments of the present systems and methods, revert a boot device to a last known state, the application data on the M.2, or the like, is typically updated much more frequently. Thus, (some embodiments) of the present systems and methods create the boot device separate from the application data. In this way, the boot device, which is updated infrequently, can be reverted separately from the data as described immediately above. However, a storage device, such as an M.2, may be divided into multiple devices to serve as (to provide) boot device 1106 and data device(s) 1132. Therein, for instance, in an NVMe M.2, a small namespace may be created for boot, and (a) separate namespace(s) is (are) created for data. The data namespace(s) may have a separate secure snapshot schedule and policy. For protection of data device(s) 1132 in accordance with embodiments of the present systems and methods, secure snapshot(s) 1134 may be taken of data device(s) 1132 and data device(s) 1132 may be exported to end-point device operating system 1108 on PCIe bus 1120, as Host NS-2 (1136) and locally stored as NS-2 (1138) under UEFI (BIOS) 1116. As separate devices, the data may have a separate, in some embodiments, more frequent, secure snapshot policy that is suitable for a functional purpose of the end-point device (1100).

Typically, a storage device such as an M.2 does not have a network interface. Thus, in accordance with embodiments of the present systems and methods, a host OS driver and software package may be used in embodiments of the present systems and methods to manage the secure snapshot(s) and restore functions. As an example, on a Windows® laptop, snapshot creation and restore may be managed by the Windows native Volume Shadow Copy Service (VSS) 1140. Such embodiments may include an embodiment of a VSS provider (1142) to leverage this feature. In addition, a (thin) driver 1144 may interface with the storage device (M.2) secure snapshot management interface.

Applications may employ more than one storage device. For example, multiple name spaces may be used on a same storage device (e.g., multiple NVMe namespaces on the same M.2) or multiple storage devices (e.g., multiple M.2s). For application-consistent secure snapshots, a host agent, such as Windows VSS employed in accordance with embodiments of the present systems and methods may instruct the applications to quiesce to a clean state for quick recovery. For example, in accordance therewith, the application may complete any transactions in progress and then stop further writes. The host agent (e.g., Windows VSS) then instructs the devices to take the snapshots as described above. Since the writes are stopped until all the devices complete the snapshots, the resulting set of snapshots across the devices are consistent with respect to the application recovery.

Embodiments of the present systems and methods enable protection of end-point device operating environment and data using a ransomware protection storage device, such as a ransomware protection M.2, that has a separate security domain from the end-point device. Embodiments of the present systems and methods provide users an extra layer of protection and fast recovery from ransomware attacks that involves the boot device and/or the data. This enables a robust defense strategy for the end-point device to return to full operating capacity with a mere reboot, even in the presence of a cyber-attack. Additionally, this protection may be provided in an "out of band" manner, such that an application on the end-point device, or even the end-point device itself, is unaware, and under normal operation, unaffected by the protection.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

In various embodiments, aspects of systems and methods described herein may be implemented, at least in part, using machine learning (ML). As used herein, the terms "machine learning" or "ML" refer to one or more algorithms that implement: a neural network (e.g., artificial neural network, deep neural network, convolutional neural network, recurrent neural network, autoencoders, reinforcement learning, etc.), fuzzy logic, artificial intelligence (AI), deep learning, deep structured learning hierarchical learning, support vector machine (SVM) (e.g., linear SVM, nonlinear SVM, SVM regression, etc.), decision tree learning (e.g., classification and regression tree or "CART"), Very Fast Decision Tree (VFDT), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), or the like.

Non-limiting examples of publicly available machine learning algorithms, software, and libraries that may be utilized within embodiments of systems and methods described herein include, but are not limited to: PYTHON, OPENCV, INCEPTION, THEANO, TORCH, PYTORCH, PYLEARN2, NUMPY, BLOCKS, TENSORFLOW, MXNET, CAFFE, LASAGNE, KERAS, CHAINER, MATLAB Deep Learning, CNTK, MatConvNet (a MATLAB toolbox implementing convolutional neural networks for computer vision applications), DeepLearnToolbox (a Matlab toolbox for Deep Learning from Rasmus Berg Palm), BigDL, Cuda-Convnet (a fast C++/CUDA implementation of convolutional or feed-forward neural networks), Deep Belief Networks, RNNLM, RNNLIB-RNNLIB, matrbm, deeplearning4j, Eblearn.Ish, deepmat, MShadow, Matplotlib, SciPy, CXXNET, Nengo-Nengo, Eblearn, cudamat, Gnumpy, 3-way factored RBM and mcRBM, mPoT, ConvNet, ELEKTRONN, OpenNN, NEURALDESIGNER, Theano Generalized Hebbian Learning, Apache SINGA, Lightnet, and SimpleDNN."

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Modules and/or engines implemented in software for execution by various types of processors may, for instance, include one or more physical or logical blocks of computer instructions, which may, for instance, be organized as an object or procedure. Nevertheless, the executables of an identified module and/or engine need not be physically located together but may include disparate instructions stored in different locations which, when joined logically together, include the module and/or engine and achieve the stated purpose for the module and/or engine. Indeed, a module and/or engine of executable code may be a single instruction, or many instructions, and may even be distributed over several different code segments, among different programs, and across several memory devices. Similarly, operational data may be identified and illustrated herein within modules and/or engines and may be embodied in any suitable form and organized within any suitable type of data structure. The operational data may be collected as a single data set or may be distributed over different locations including over different storage devices.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An information handling system ransomware protection method comprising:
   implementing, by storage device ransomware protection logic, secure snapshot policies in a domain of a storage device by taking a secure snapshot of a data object, comprising creating a point in time image of a storage object and retaining the point in time image of the storage object until a retention timer has expired;
   implementing, by the storage device ransomware protection logic, snapshot virtualization in the domain of the storage device by mapping the secure snapshot;
   creating a secure snapshot of a boot device of the information handling system;
   creating a secure alternate boot device on each boot of the information handling system;
   exporting the secure alternate boot device to a basic input/output system of the information handling system; and
   configuring a boot order of the information handling system with the secure alternate boot device immediately after the boot device in the boot order.

2. The method of claim 1, further comprising implementing, by the storage device ransomware protection logic, vault semantics and operational controls to data in the domain of the storage device by applying the vault semantics and operational controls to data as management functions of the secure snapshot.

3. The method of claim 1, further comprising implementing ransomware detection by the storage device ransomware protection logic in the domain of the storage device, by:
   implementing, by the storage device ransomware protection logic, inline ransomware attack detection; and/or
   implementing, by the storage device ransomware protection logic, near-line ransomware attack detection, using periodic snapshots, comprising evaluating, by the storage device ransomware protection logic, probability of a ransomware attack based, at least in part, on a delta change set in consecutive snapshots.

4. The method of claim 1, wherein the storage device ransomware protection logic comprises a set of commands to create the snapshot with the retention time, delete the snapshot with proper authentication, and map the secure snapshot to a namespace.

5. The method of claim 4, wherein creating the secure snapshot comprises creating, by snapshot virtualization logic, in the storage device ransomware protection logic, a secure snapshot identifier and a mapping for the secure snapshot, preserving a view of the data object as of the point in time the secure snapshot is taken.

6. The method of claim 4, further comprising implementing secure snapshot access by creating the secure snapshot as an object in the storage device ransomware protection logic and mapping the secure snapshot to a storage device namespace, as a target device for discovery by the information handling system.

7. A method for protecting boot of an information handling system using a storage device ransomware protection logic of the information handling system, the method comprising:
   creating, by a storage device ransomware protection logic of an information handling system, a secure snapshot of the information handling system boot device;
   creating, by the storage device ransomware protection logic, a secure alternate boot device on each boot of the information handling system;
   exporting the secure alternate boot device, by the storage device ransomware protection logic, to a basic input/output system of the information handling system; and
   configuring, by the information handling system, a boot order of the information handling system, with the secure alternate boot device immediately after the boot device in the boot order.

8. The method of claim 7, wherein creating the secure alternate boot device on each boot of the information handling system comprises the storage device ransomware protection logic creating a read and writeable snapshot from the secure snapshot of the information handling system boot device.

9. The method of claim 8, further comprising:
   deleting, on each subsequent boot of the information handling system, the read and writeable snapshot for the prior boot; and
   creating a new read and writeable snapshot from a secure snapshot of the information handling system boot device from the subsequent boot of the information handling system.

10. The method of claim 7, wherein creating the secure snapshot of the boot device further comprises using a snapshot virtualization and mapping of the storage device ransomware protection logic, to create the secure snapshot of the boot device while the boot device is in a known good state.

11. The method of claim 7, further comprising exporting, by the storage device ransomware protection logic, the boot device, with the secure alternate boot device, to the basic input/output system of the information handling system.

12. The method of claim 11, further comprising discovering, by the basic input/output system of the information handling system both the boot device and the secure alternate boot device.

13. The method of claim 7, wherein, in response to the information handling system failing to boot from the boot device, the information handling system booting from the secure alternate boot device.

14. An information handling system ransomware protection device comprising:
   a ransomware protection engine configured to:
     implement secure snapshot policies in a domain of a storage device by taking a secure snapshot of a data object, comprising creating a point in time image of a storage object and retaining the point in time image of the storage object until a retention timer has expired;

implement vault semantics and operational controls to data in the domain of the storage device by applying the vault semantics and operational controls to data as management functions of the secure snapshot;
implement snapshot virtualization in the domain of the storage device by mapping the secure snapshot;
create a secure snapshot of a boot device of the information handling system;
create a secure alternate boot device on each boot of the information handling system; and
export the secure alternate boot device to a basic input/output system of the information handling system;
wherein the information handling system is configured to configure a boot order of the information handling system with the secure alternate boot device immediately after the boot device in the boot order.

15. The information handling system ransomware protection device of claim 14, wherein the ransomware protection engine is further configured to:
implement ransomware detection in the domain of the storage device comprising:
implement inline ransomware attack detection; and/or
implement near-line ransomware attack detection, using periodic snapshots, comprising evaluating, by the storage device ransomware protection logic, probability of a ransomware attack based, at least in part, on a delta change set in consecutive snapshots; and
stop incoming write and take the secure snapshot, in response to detection of a ransomware attack.

16. The information handling system ransomware protection device of claim 14, wherein the information handling system ransomware protection device comprises the storage device and the storage device comprises an application specific integrated circuit comprising the ransomware protection engine.

17. The information handling system ransomware protection device of claim 14, wherein the information handling system ransomware protection device comprises an application specific integrated circuit comprising the ransomware protection engine coupled to the storage device.

18. The information handling system ransomware protection device of claim 17, wherein the information handling system comprises the application specific integrated circuit and the application specific integrated circuit is coupled to the storage device by the information handling system.

19. The information handling system ransomware protection device of claim 14, wherein the information handling system ransomware protection device comprises the storage device and a memory controller of the storage device comprises the ransomware protection engine.

* * * * *